United States Patent Office 3,119,827
Patented Jan. 28, 1964

3,119,827
10-ACYL YOHIMBANES AND PROCESS THEREFOR
John Shavel, Jr., Mendham, N.J., assignor to Warner-Lambert Pharmaceutical Company, Morris Plains, N.J., a corporation of Delaware
No Drawing. Filed Feb. 10, 1961, Ser. No. 88,303
28 Claims. (Cl. 260—287)

The present invention relates to new and novel alkaloid derivatives of the formula:

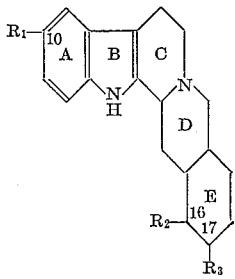

wherein $R_1$ is the acyl radical of an aliphatic carboxylic acid containing 1 to 6 carbon atoms and the $R_2$ and $R_3$ substituents are as follows:

when $R_3$ is hydrogen, $R_2$ is hydrogen, lower alkyl or keto;
when $R_3$ is keto, $R_2$ is lower alkyl;
when $R_3$ is lower alkoxy, $R_2$ is carbo lower alkoxy; and
when $R_3$ is a radical of the formula —$OR_4$, $R_2$ is hydrogen, lower alkyl, carbo lower alkoxy or a radical of the formula —$CH_2OR_4$, $R_4$ being hydrogen, the acyl radical of an aliphatic carboxylic acid containing 1 to 6 carbon atoms, benzoyl or substituted benzoyl.

The present invention also relates to a method of preparing these novel alkaloid derivatives and to the pharmaceutically acceptable non-toxic acid addition and quaternary ammonium salts thereof.

The terms "lower alkyl" and "lower alkoxy" as used throughout the specification and claims denote straight and branched chain radicals containing 1 to 6 carbon atoms.

The compounds of this invention are 10, 16, 17 substituted derivatives of the ring system comprised of the 5 rings denoted by A, B, C, D and E of the above formula. Depending upon the configuration of the hydrogen atom at the 3-position and the presence of cis- or trans-fusion of the D and E rings, four different compounds are possible in this ring system. In yohimbane and 3-epiyohimbane, the D and E rings are transfused, the two compounds differing by reason of different configurations of the hydrogen atom at the 3-position. In alloyohimbane and 3-epialloyohimbane, the D and E rings are cis-fused, the two compounds again differing from each other by reason of different configurations of the hydrogen atom at the 3-position. The present invention includes within its scope derivatives of yohimbane, 3-epiyohimbane, alloyohimbane and 3-epilloyohimbane with $R_1$, $R_2$ and $R_3$ substituents at the 10, 16 and 17 positions, respectively.

In addition, since the carbon atoms at the 16 and 17 positions of the compounds of this invention are asymmetric carbon atoms when $R_1$ and/or $R_2$ substituents other than hydrogen and keto are present, various epimers are possible, depending on whether the substituent is in the α- or β-configuration. All such epimers are included within the scope of the present invention.

While various 16- and/or 17-substituted derivatives of these alkaloids of the yohimbane series have heretofore been known, the substitution of an acyl group at the 10-position is new and forms the essence of this invention.

Included within the scope of this invention are 10-acetylyohimbane, 10-acetyl-3-epiyohimbane, 10-acetylalloyohimbane, 10-acetyl-3-epialloyohimbane, 10-propionylyohimbane, 10-butyrylyohimbane, 10-valerylyohimbane, 10 - acetyl-16α-methylyohimbane, 10-acetyl-16α-ethyl-3-epiyohimbane, 10-acetyl-17α-acetoxyyohimbane, 10 - acetyl-17β-acetoxyyohimbane, 10-acetyl-16-ketoyohimbane, 10-acetyl-16-keto-3-epiyohimbane, 10-acetyl-16-ketoalloyohimbane, 10-acetyl-16-keto-3-epialloyohimbane, 10-acetylyohimbine acetate, 10-acetyl-β-yohimbine acetate, 10-acetylyohimbine methyl ether, 10-acetyl-β-yohimbine methyl ether, 10-acetyl-17α-acetoxy-16α-methylyohimbane, 10-acetyl-17α-acetoxy-16α-methyl-3-epiyohimbane, 10-acetyl-16α-methylyohimbone, 10-acetyl-16α-methyl-3-epiyohimbone, 10-acetyl-16α-methylalloyohimbone, 10-acetyl-16α-methyl-3-epialloyohimbone, 10-acetylyohimbyl alcohol diacetate, 10-acetyl-3-epiyohimbine acetate, 10-acetyl-α-yohimbine acetate, 10-acetyl-3-epialloyohimbine acetate, 10-acetyl-3-epi-β-yohimbine acetate, 10-propionylyohimbine propionate, 10-acetylyohimbine, 10-acetyl-α-yohimbine, 10-acetyl-3-epiyohimbine, 10-acetyl-3-epialloyohimbine, 10-acetyl-16α-methylyohimbol, 10-acetyl-16β-methylyohimbol, 10-acetylyohimbyl alcohol, 10-acetyl-17β - hydroxyyohimbane, 10-acetyl-17α-hydroxyyohimbane, 10-acetylyohimbine propionate, 10- propionylyohimbine acetate, 10-acetylyohimbine benzoate, 10-acetylyohimbine 3,4,5-trimethoxybenzoate, 10-acetyl-β-yohimbine, 10-acetyl-α-yohimbine benzoate, 10-acetyl-3-epiyohimbine benzoate, 10-acetyl-3-epialloyohimbine benzoate, 10-acetylyohimbyl alcohol dibenzoate, 10-acetylyohimbyl alcohol di(3,4,5-trimethoxybenzoate), and the like.

The new and novel compounds of this invention have interesting pharmacological activity and are useful as analgesics, tranquilizers, and hypotensive agents. In addition, they are valuble intermediates in the production of other compounds of the yohimbane series.

It has now been found that those compounds of this invention of the formula:

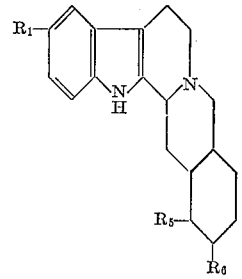

wherein $R_1$ is as described hereinabove and the $R_5$ and $R_6$ substituents are as follows:

when $R_6$ is hydrogen, $R_5$ is hydrogen, lower alkyl or keto;

when $R_6$ is keto, $R_5$ is lower alkyl;

when $R_6$ is lower alkoxy, $R_5$ is carbo lower alkoxy; and when $R_6$ is a radical of the formula —$OR_1$, $R_5$ is hydrogen, lower alkyl, carbo lower alkoxy, or a radical lower alkyl, carbo lower alkoxy, or a radical of the formula —$CH_2OR_1$, may be prepared by treating a compound of the formula:

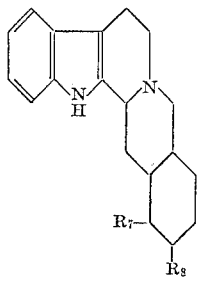

wherein the $R_7$ and $R_8$ substituents are as follows:

when $R_8$ is hydrogen, $R_7$ is hydrogen, lower alkyl, or keto;

when $R_8$ is keto, $R_7$ is lower alkyl;

when $R_8$ is lower alkoxy, $R_7$ is carbo lower alkoxy; and when $R_8$ is hydroxyl, $R_7$ is hydrogen, lower alkyl, carbo lower alkoxy, or hydroxymethyl, with an acid anhydride or acyl halide having $R_1$ acyl groups in the presence of a Friedel-Crafts catalyst.

The reaction is one of acylation, with an $R_1$ acyl group being substituted at the 10-position of the starting materials and also replacing the terminal hydrogen atoms on the $R_7$ and $R_8$ substituents when $R_7$ is hydroxymethyl and/or $R_8$ is hydroxyl.

The acylation reaction is carried out in the liquid phase under anhydrous conditions with an acid anhydride or an acyl halide constituting the source of the desired $R_1$ acyl radical. The reaction mixture contains a Friedel-Crafts catalyst, for example boron trifluoride, aluminum chloride, aluminum bromide, stannic chloride, ferric chloride, ferric bromide, hydrofluoric acid, polyphosphoric acid, titanium tetrachloride, sulfuric acid and the like. It has been found that boron trifluoride is a particularly effective catalyst in the method of this invention.

The reaction temperature is maintained within the range of about +25° C. to —40° C. The reaction mixture may also contain a carboxylic acid or a carboxylic acid ester corresponding to the acid anhydride or acid halide, that is, a carboxylic acid of the formula $R_1$—OH, or an ester of the formula $R_1$—OR', wherein R' is a lower alkyl group.

In carrying out the reaction, the acylating agent (acid anhydride or acid halide), either with or without the corresponding acid or ester, is initially saturated with catalyst, preferably at a temperature within the range of —20° C. to +10° C. The temperature of the resulting mixture is then adjusted to the desired reaction temperature and the yohimbane starting material is added, either as a solid or as a solution in the acylating agent or in an inert organic solvent, such as methylene chloride, dioxan, tetrafuran and the like. The reaction mixture is then stirred at the reaction temperature to completion. The reaction time is normally between about 5 minutes and 4 hours, the time depending upon the reactivity of the starting material.

The starting materials of the formula:

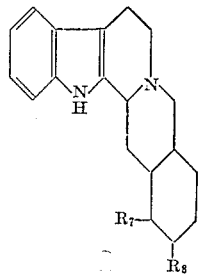

wherein $R_7$ and $R_8$ are as described hereinabove are all alkaloids of the yohimbane series. Exemplary of compounds embraced by the above formula which are useful starting materials for the preparation of the compounds of this invention are yohimbane, 3-epiyohimbane, alloyohimbane, 3-epialloyohimbane, yohimbine, β-yohimbine, 3-epiyohimbine, β-yohimbine methyl ether, 3-epi-β-yohimbine, α-yohimbine (alloyohimbine), yohimbyl alcohol, 16α-methylyohimbane, yohimbol, epiyohimbol, 16-ketoyohimbane, 16α-methylyohimbol, 16α-methylyohimbone and the like.

At the conclusion of the reaction, the product is recovered from the reaction mixture, for example by pouring the reaction mixture onto crushed ice, adding base followed by extraction with an organic solvent such as chloroform. The chloroform extract is then processed by conventional techniques of crystallization and chromatography to yield the desired product in pure form.

Those products of the above described acylation reaction having the formula:

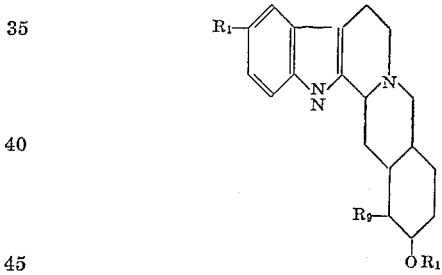

wherein $R_1$ is as described hereinabove and $R_9$ is hydrogen, lower alkyl, carbo lower alkoxy or a radical of the formula —$CH_2OR_1$ may be converted to those compounds of this invention having the formula:

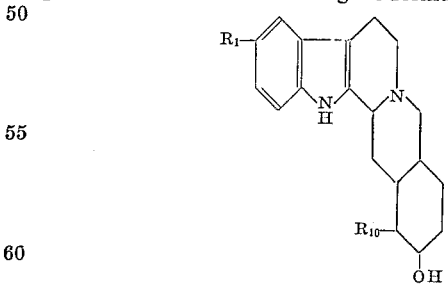

wherein $R_{10}$ is hydrogen, lower alkyl, carbo lower alkoxy or hydroxymethyl by hydrolysis in the presence of a basic catalyst such as an alkali metal alkoxide, for example sodium methoxide, sodium ethoxide and the like. In this hydrolysis reaction, the terminal $R_1$ radicals on the substituent at the 17 and/or 16 positions are converted to hydrogen atoms, thereby forming the corresponding alcohols. It is a feature of this reaction, however, that the $R_1$ substituent at the 10-position is not affected by the treatment.

The reaction is carried out by refluxing a solution of the starting material in a lower alkyl alcohol, such as methanol, ethanol and the like in the presence of an alkali metal alkoxide. The alkoxide, which functions as a catalyst in the reaction, may conveniently be formed in situ by the addition of an alkali metal to the alcohol. Thus, the addition of metallic sodium to absolute methanol results in the formation of a methanol solution of sodium methoxide, to which the starting material may be added. The reaction mixture is refluxed to completion, about 1 to 15 hours being normally required.

At the conclusion of the reaction, the reaction mixture is processed for the recovery of the product therefrom, by conventional techniques of crystallization, chromatography and the like.

The products of the above described hydrolysis, which are monohydroxy alcohols, or dihydroxy alcohols when $R_{10}$ is hydroxymethyl, may, if desired, be esterified by conventional esterification techniques to form those compounds of this invention having the formula:

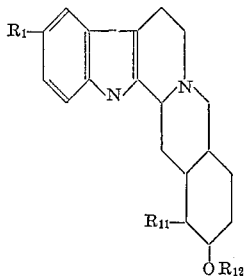

wherein $R_{11}$ is hydrogen, lower alkyl, carbo lower alkoxy or a radical of the formula —$CH_2OR_{12}$ and $R_{12}$ is the acyl radical of an aliphatic carboxylic acid having 1 to 6 carbon atoms but differing from the acid from which the $R_1$ acyl radical is derived, benzoyl or substituted benzoyl.

It is to be understood that the new and novel compounds of this invention may be used as the free base or may be converted into the corresponding pharmaceutically acceptable non-toxic acid addition and quaternary ammonium salts. Exemplary of non-toxic acid addition salts are those formed with maleic, fumaric, benzoic, ascorbic, succinic, bismethylensalicylic, methylsulfonic, ethanedisulfonic, acetic, propionic, tartaric, salicylic, citric, gluconic, lactic, malic, mandelic, cinnamic, citraconic, stearic, palmitic, itaconic, glycolic, benzenesulfonic, hydrohloric, hydrobromic, sulfuric, sulfamic, phosphoric and nitric acids. The acid addition salts are prepared in the conventional manner, for example, by treating a solution or suspension of the free base in an organic solvent with the desired acid, and then recovering the salt which forms by crystallization techniques. The quaternary salts are prepared by heating a suspension of the base in a suitable solvent with a reactive alkyl halide such as methyl iodide, ethyl bromide, n-hexyl bromide, benzyl chloride or a reactive ester such as methyl sulfate, ethyl sulfate or methyl p-toluene sulfonate.

For therapeutic use, the new and novel compounds of this invention, as the free base, or as their acid addition or quaternary ammonium salts, may be formulated with conventional pharmaceutical carriers into dosage unit forms, such as tablets, capsules, elixirs, suppositories, solutions, suspensions and the like.

The following examples are included in order further to illustrate the present invention:

*Example 1*

A mixture of 15 ml. glacial acetic acid and 150 ml. acetic anhydride is saturated with boron trifluoride at a temperature of —20 to +10° C. by passing boron trifluoride into the solution for 15 minutes. The resulting mixture is cooled to —20° C. and 36 g. yohimbane are added. The reaction mixture is agitated for 2.5 hours and is then poured onto crushed ice. The resulting suspension is made basic with ammonium hydroxide and extracted with chloroform. The extract is dried over sodium sulfate, filtered and evaporated to dryness. The oil is crystallized from acetonitrile to yield 28 grams of crystals.

The crystals are dissolved in 1:1 acetonitrile-chloroform and chromatographed over magensium silicate using acetonitrile for elution. The first 1400 ml. of eluate is filtered, evaporated until crystals form and refrigerated.

Yield: 21 g. of 10-acetylyohimbane, M.P. 203–205° C. (dec.); $[\alpha]_D^{25}$ —85° (pyridine, c.=0.5).

*Analysis.*—Calc.: C, 78.22; H, 8.13; N, 8.69. Found: C, 78.13; H, 8.04; N, 8.53.

*Example 2*

15 ml. glacial acetic acid, 150 ml. acetic anhydride and 12 g. 16α-methylyohimbane are reacted in the presence of boron trifluoride for 2 hours at —20° C. as described in Example 1. The chloroform extract is crystallized twice from methanol to yield 10-acetyl-16α-methylyohimbane as the hemimethanolate, M.P. 224–226° C. (dec.); $[\alpha]_D^{25}$ —95° (pyridine, c.=0.6).

*Analysis.*—Calc.: C, 76.66; H, 8.58; N, 7.95. Found: C, 76.74; H, 8.54; N, 7.84.

*Example 3*

10 ml. glacial acetic acid, 100 ml. acetic anhydride and 5 g. 16-ketoyohimbane are reacted in the presence of boron trifluoride for 2.5 hours at —25° C. as described in Example 1. Crystallization of the chloroform extract from acetonitrile yields 2.54 g. of crystals. An additional 0.25 g. is recovered from the mother liquor by chromatography over magnesium silicate using acetonitrile as eluant. The combined solids are recrystallized from methanol to yield 1.60 g. of 10-acetyl-16-ketoyohimbane as the hemihydrate, M.P. 153–158° C. (dec.); $[\alpha]_D^{25}$ —59° (pyridine, c.=0.6).

*Analysis.*—Calc.: C, 73.02; H, 7.30; N, 8.11. Found: C, 73.47; H, 7.11; N, 8.12.

*Example 4*

50 ml. glacial acetic acid and 100 ml. acetic anhydride are saturated with boron trifluoride as described in Example 1. The solution is cooled to —35° C. and a suspension of 10 g. 16α-methylyohimbone (prepared as described in copending appl. Ser. No. 849,464, filed October 29, 1959) in 100 ml. acetic anhydride is added over a period of 5 minutes. The mixture is stirred for 5 minutes and immediately poured on ice and the pH adjusted to 7 with ammonium hydroxide. Crystallization of the solid from acetonitrile yields 8 g. of solid. Recrystallization yields pure 10-acetyl-16α-methylyohimbone as the hemihydrate, M.P. 249–252° C. (dec.); $[\alpha]_D^{25}$ —71° (pyridine, c.=0.8).

*Analysis.*—Calc.: C, 73.62; H, 8.01; N, 7.57. Found: C, 73.51; H, 7.57; N, 7.79.

The following acid addition salts of 10-acetyl-16α-methylyohimbone are prepared:

10-acetyl-16α-methylyohimbone hemistrate (as the methanolate), M.P. 221–223° C. (dec.), $[\alpha]_D^{25}$ —58° (chloroform, c.=0.85).

10-acetyl-16α-methylyohimbone hydrochloride (as the hemiethanolate), M.P. 306–308° C. (dec.), $[\alpha]_D^{25}$ —27° (pyridine, c.=0.65).

10-acetyl-16α-methylyohimbone sulfate (as the hemihydrate), M.P. 272–273° C. (dec.), $[\alpha]_D^{25}$ +27° (95% aqueous pyridine, c.=0.53).

10-acetyl-16α-methylyohimbone monophosphate (as the hydrate), M.P. 283–286° C. (dec.), $[\alpha]_D^{25}$ —18° (95% aqueous pyridine, c.=0.76).

*Example 5*

12.1 g. epiyohimbol is reacted with a boron trifluoride saturated solution of 15 ml. glacial acetic acid in 125 ml. acetic anhydride for 4 hours at —20° C. by the procedure of Example 1. Crystallization of the chloroform extract from acetonitrile yields 6.5 g. of material which on recrystallization from acetonitrile yields pure 10-acetylepiyohimbol acetate (as the hemihydrate), M.P. 260–264° C. (dec.), $[\alpha]_D^{25}$ −7° (pyridine, c.=0.85).

*Analysis.*—Calc.: C, 70.92; H, 7.51; N, 7.19. Found: C, 70.44; H, 7.38; N, 7.19.

*Example 6*

To a solution of sodium methoxide prepared by dissolving 1 g. sodium in 450 ml. methanol is added 6.5 g. 10-acetylepiyohimbol acetate and the mixture is refluxed for 2 hours. Aqueous acetic acid is then added to neutralize the mixture and the methanol is removed by distillation in vacuo. The residue is dissolved in dilute acetic acid, the solution is cooled by the addition of ice and made basic with ammonium hydroxide. The precipitate is dried and recrystallized from acetonitrile to yield 2.2 g. 10-acetylepiyohimbol, M.P. 279–283° C. (dec.); $[\alpha]_D^{25}$ −44° (pyridine, c.=0.3).

*Analysis.*—Calc.: C, 74.52; H, 7.74; N, 8.28. Found: C, 74.13; H, 7.85; N, 8.27.

*Example 7*

20 ml. glacial acetic acid and 85 ml. acetic anhydride are saturated with boron trifluoride as described in Example 1. A solution of 5 g. 16α-methylyohimbol dissolved in 20 ml. acetic acid and 20 acetic anhydride is added and the mixture is stirred at −30° C. for 4 hours. The reaction mixture is then processed as described in Example 1 to yield 4.7 g. of crystals from acetonitrile. Two more recrystallizations from acetonitrile yield pure 10-acetyl-16α-methylyohimbol acetate, M.P. 252–257° C. (dec.); $[\alpha]_D^{25}$ −2° (pyridine, c.=0.5).

*Analysis.*—Calc.: C, 73.06; H, 7.67; N, 7.10. Found: C, 73.02; H, 7.63; N, 7.30.

*Example 8*

To a solution of 1.9 g. sodium methoxide in 300 ml. methanol is added 4.6 g. 10-acetyl-16α-methylyohimbol acetate and the mixture is refluxed for 1.5 hours. The reaction mixture is processed as described in Example 6. Recrystallization from acetonitrile yields 10-acetyl-16α-methylyohimbol, M.P. 271–275° C. (dec.); $[\alpha]_D^{25}$ −4° (pyridine, c.=0.50).

*Analysis.*—Calc.: C, 74.96; H, 8.01; N, 7.95. Found: C, 74.87; H, 8.20; N, 8.15.

*Example 9*

Interaction of 50 g. yohimbyl alcohol with a boron trifluoride saturated mixture of 25 ml. glacial acetic acid and 200 ml. acetic anhydride for 2.5 hours at −20° C. by the procedure described in Example 1 yields as a chloroform extract an oil which can not be crystallized. It is dissolved in a small amount of 5 N acetic acid and on slow addition of saturated aqueous ammonium chloride to the stirred solution a gummy precipitate forms. The supernatant solution is decanted from the gum, basified with ammonium hydroxide, and extracted with chloroform. The chloroform solution is dried over sodium sulfate, and distilled in vacuo to yield an oil which is dissolved in a small amount of ethyl acetate and chromatographed over 200 g. of magnesium silicate. Evaporation of the first 600 ml. of ethyl acetate eluate gives an oil which on crystallization from methanol yields 10.9 g. of material.

The gum which came down on the addition of the ammonium chloride is dissolved in a small amount of absolute ethanol and 200 ml. benzene is added. During concentration by distillation in vacuo, some dark brown material precipitates from solution. This is discarded and the solution evaporated to dryness. The residue is triturated with aqueous ammonium hydroxide and extracted with chloroform. The chloroform solution is dried over sodium sulfate and the solvent evaporated in vacuo to give an oil which on crystallization from acetonitrile yields two crops totaling 12.4 g. This material is combined with the 10.9 g. of material, described above, and the solids are recrystallized from acetonitrile to give 15 g. of crystals. Another recrystallization from acetonitrile followed by one from methanol yields pure 10-acetylyohimbyl alcohol diacetate (as the hemihydrate), M.P. 207–209° C. (dec.), $[\alpha]_D^{25}$ +42° (pyridine, c.=0.80).

*Analysis.*—Calc.: C, 67.92; H, 7.31; N, 5.98. Found: C, 67.52; H, 7.16; N, 5.95.

*Example 10*

A solution of 1.0 g. 10-acetylyohimbyl alcohol diacetate and 1.0 g. sodium methoxide in 125 ml. methanol is refluxed for 2.5 hours. The methanol is removed by distillation in vacuo, water is added, and the precipitate recrystallized twice from methanol to yield 10-acetylyohimbyl alcohol as the monohydrate, M.P. 278–283° C., (dec.); $[\alpha]_D^{25}$ +30° (pyridine, c.=0.65).

*Analysis.*—Calc.: C, 68.37; H, 7.82; N, 7.25. Found: C, 68.64; H, 8.26; N, 7.12.

*Example 11*

A solution of 15 ml. propionic acid and 50 ml. propionic anhydride in 100 ml. methylene chloride is saturated with boron trifluoride by passing the latter into the solution for about 15 minutes, maintaining a temperature of −15° C. The mixture is cooled to −30° C. and a suspension of 50 g. yohimbine in 150 ml. methylene chloride is added. Stirring is continued at this temperature for 2.5 hours. The solution is then poured onto 4 liters of crushed ice, basified by the addition of ammonium hydroxide and the layers are separated. The aqueous layer is extracted with two 325 ml. portions of chloroform and the combined organic layers dried over sodium sulfate and evaporated in vacuo to give an oil. This is dissolved in 600 ml. 5 N propionic acid and treated with 100 ml. of a saturated solution of ammonium chloride. The crude hydrochloride which precipitates is collected, washed with water, and dried. Yield: 40.7 g. One gram was recrystallized twice from water to yield 10-propionylyohimbine propionate hydrochloride (as the hemihydrate), M.P. 269–277° C., $[\alpha]_D^{25}$ +104° (pyridine, c.=0.31).

The remainder of the once recrystallized hydrochloride is suspended in water, stirred with an excess of ammonium hydroxide solution and extracted with chloroform. The chloroform solution is dried over sodium sulfate and evaporated in vacuo to dryness to yield an oil which is crystallized from acetonitrile. Yield: 25.4 g. Two recrystallizations from acetonitrile give the pure base, 10-propionylyohimbine propionate, M.P. 190–194° C. (dec.), $[\alpha]_D^{25}$ +67° (pyridine, c.=0.82).

*Analysis.*—Calc.: C, 69.50; H, 7.35; N, 6.00. Found: C, 69.23; H, 7.33; N, 5.92.

*Example 12*

5 g. yohimbine hydrochloride is reacted with a boron trifluoride saturated solution of 5 ml. glacial acetic acid in 50 ml. acetic anhydride for 2 hours at −20° C. by the procedure of Example 1. Crystallization of the chloroform extract from acetonitrile yields 23.2 g. of material in two crops which on recrystallization from acetonitrile yields 10-acetylyohimbine acetate (with ½ mol of acetonitrile), M.P. 200–204° C. (dec.), $[\alpha]_D^{25}$ +61° (pyridine, c.=0.7).

*Analysis.*—Calc.: C, 68.03; H, 6.92; N, 7.63. Found: C, 67.76; H, 6.92; N, 7.43.

The following acid addition salts are prepared:

10-acetylyohimbine acetate hemicitrate (as the dihydrate), M.P. 179–183° C. (dec.), $[\alpha]_D^{25}$ +49° (pyridine, c.=1.0).

10-acetylyohimbine acetate monophosphate (as the dihydrate), M.P. 270–273° C. (dec.), $[\alpha]_D^{25}$ +60° (95% aqueous pyridine, c.=0.55).

10-acetylyohimbine acetate hydrochloride (as the hemiethanolate), M.P. 306–308° C. (dec.), $[\alpha]_D^{25}$ +90° (95% aqueous pyridine, c.=1.0).

The following quaternary ammonium salt is prepared: 10-acetylyohimbine acetate methiodide, M.P. 291–294° C. (dec.), $[\alpha]_D^{25}$ +86° (pyridine, c.=0.5).

Example 13

To a solution of sodium methoxide prepared by the addition of 0.5 g. sodium to 450 ml. methanol, there is added 5 g. 10-acetylyohimbine acetate and the mixture is refluxed for 4 hours. Glacial acetic acid is added to pH 5–6 and the methanol is distilled off in vacuo. The residue is dissolved in water and the solution made basic by the addition of ammonium hydroxide. The resulting precipitate is collected, washed with water, dried, and crystallized from acetonitrile. Yield: 2.8 g. Recrystallization from acetonitrile yields pure 10-acetylyohimbine (as the hemimethanolate), M.P. 224–229° C. (dec.), $[\alpha]_D^{25}$ +78° (pyridine c.=0.62).

*Analysis.*—Calc.: C, 67.27; H, 7.06; N, 6.54. Found: C, 67.23; H, 7.14; N, 6.86.

Example 14

A cooled, stirred solution of 5 g. 10-acetylyohimbine in 20 ml. dry pyridine is treated dropwise with 3.4 ml. benzoyl chloride. The mixture is allowed to stand at room temperature for two hours, poured onto crushed ice, and basified by the addition of ammonium hydroxide. The precipitate which formed is collected, washed with water, air dried, dissolved in benzene and chromatographed over 100 g. alumina. The benzene eluate is evaporated to dryness, the residue is dissolved in dilute acetic acid, and saturated ammonium chloride solution is added to cause the hydrochloride to precipitate. The crude hydrochloride is collected and recrystallized from water to give 1.7 g. of 10-acetylyohimbine benzoate hydrochloride, M.P. 230–238° C. (dec.), $[\alpha]_D^{25}$ +157° (pyridine, c.=0.38). The hydrochloride is triturated with ammonium chloride and the free base is extracted out with chloroform. Evaporation of the chloroform followed by recrystallization of the residue from ethyl acetate yields 10-acetylyohimbine benzoate, M.P. 200–204° C. (dec.), $[\alpha]_D^{25}$ −2° (pyridine, c.=0.68).

*Analysis.*—Calc.: C, 70.56; H, 6.77; N, 5.88. Found: C, 70.26; H, 6.77; N, 5.64.

Example 15

To a solution of 5 g. of 10-acetylyohimbine in 20 ml. pyridine (previously dried over KOH) is added dropwise with stirring and cooling a solution of 6 g. 3,4,5-trimethoxybenzoyl chloride in 20 ml. pyridine. The solution turned light brown in color and set up as a gel. It is allowed to stand at room temperature for two hours and then in the refrigerator overnight. Water is added and the mixture made basic by the addition of ammonium hydroxide. The precipitate which forms is collected, dried, and dissolved in benzene. The solution is evaporated to dryness, dissolved in a small amount of acetonitrile, and chromatographed over 70 g. acid washed alumina, eluting with acetonitrile. The first liter of eluate is evaporated to dryness, the residue is dissolved in a minimal amount of ethanol and 450 ml. of absolute ether is added. A slight excess of ethanolic HCl is then added with stirring and cooling. The precipitate which forms is collected, washed with absolute ether and crystallized from ethanol to give 2.26 g. of 10-acetylyohimbine 3,4,5-trimethoxybenzoate (as the hydrochloride with 1.5 mols water), M.P. 213–218° C. (dec.), $[\alpha]_D^{25}$ +173° (pyridine, c.=0.35).

*Analysis.*—Calc.: C, 60.59; H, 6.47; N, 4.28; Cl. 5.42. Found: C, 60.70; H, 6.48; N, 4.53; Cl, 5.82.

Example 16

50 ml. glacial acetic acid and 250 ml. acetic anhydride are saturated with boron trifluoride and reacted with 50 ml. β-yohimbine for 2 hours at −20° C. by the procedure of Example 1. Crystallization of the chloroform extract from acetone yields 36.6 g. of material which on two recrystallizations from acetone yields pure 10-acetyl-β-yohimbine acetate (with ¾ mol water), M.P. 282–285° C. (dec.), $[\alpha]_D^{25}$ +49° (pyridine, c.=0.61).

*Analysis.*—Calc.: C, 66.43; H, 7.02; N, 6.20. Found: C, 66.52; H, 7.34; N, 5.95.

Example 17

To a solution of sodium methoxide prepared by dissolving 2 g. sodium in 250 ml. methanol is added 10 g. 10-acetyl-β-yohimbine acetate and the resulting solution is refluxed for thirteen hours. The solution is cooled, neutralized to pH 6 by the addition of acetic acid, and the methanol is removed by distillation in vacuo. The residue is dissolved in dilute acetic acid, basified by the addition of aqueous ammonia, and the resulting mixture extracted with chloroform. The chloroform solution is dried over sodium sulfate and distilled in vacuo to dryness to yield a white solid which on recrystallization from acetonitrile yields 7.9 g. of product. Another recrystallization from acetonitrile yields pure 10-acetyl-β-yohimbine (as the hemihydrate), M.P. 252–253° C. (dec.), $[\alpha]_D^{25}$ −17° (pyridine, c.=0.7).

*Analysis.*—Calc.: C, 68.13; H, 7.21; N, 6.91. Found: C, 68.07; H, 7.30; N, 6.66.

Example 18

25 ml. glacial acetic acid and 125 ml. acetic anhydride are saturated with boron trifluoride and reacted with 25 g. β-yohimbine methyl ether for one hour at −20° C. by the procedure of Example 1. Crystallization of the chloroform extract from acetone yields 13.7 g. of material which on recrystallization from acetone yields pure 10-acetyl-β-yohimbine methyl ether (as the hemihydrate), M.P. 254–257° C. (dec.), $[\alpha]_D^{25}$ −19° (pyridine, c.=0.65).

*Analysis.*—Calc.: C, 68.71; H, 7.45; N, 6.68. Found: C, 68.83; H, 7.81; N, 6.77.

Example 19

A solution of 50 ml. methylene chloride in 150 ml. acetic anhydride is saturated with boron trifluoride by passing in the latter for about 15 minutes while maintaining a temperature of −20° C. A suspension of 4 g. 3-epiyohimbine in 50 ml. methylene chloride is added slowly with stirring and the mixture is stirred at −30 to −40° °C. for 1.5 hours. The stirring is continued for thirty minutes longer with the now clear solution being allowed to warm to −15° C. It is then poured onto 1500 ml. crushed ice, and basified by the addition of ammonium hydroxide. The layers are separated and the aqueous layer extracted with 100 ml. methylene chloride. The combined methylene chloride solutions are dried over sodium sulfate and evaporated to dryness. The resulting oil is dissolved in dilute acetic acid and basified with ammonium hydroxide. A gummy precipitate forms which solidifies when triturated with ammonium hydroxide. After drying overnight in a vacuum desiccator, the solids are crystallized from acetonitrile to yield 3.75 g. of material in two crops. Recrystallization from acetonitrile gives pure 10-acetyl-3-epiyohimbine acetate, M.P. 233–236° C., $[\alpha]_D^{25}$ −117° (pyridine, c.=0.75).

*Analysis.*—Calc.: C, 68.47; H, 6.90; N, 6.39. Found: C, 68.62; H, 7.00; N, 6.66.

Example 20

To a solution of 1 g. sodium in 750 ml. methanol is added, portionwise, 35.5 g. 10-acetyl-3-epiyohimbine acetate and the resulting solution is refluxed for five hours. The solution is cooled, neutralized to pH 5 by the addition of acetic acid and the methanol is distilled off in vacuo. The residue is dissolved in dilute acetic acid, cooled by the addition of crushed ice, and basified by the addition of aqueous ammonium hydroxide. The precipitate which forms is collected by filtration, washed with water, and dried in vacuo at 110° C. for six hours. It is dissolved in ethyl acetate and chromatographed over acid washed alumina. Since none of the eluate fractions could be made to crystallize, they are all combined and evaporated to give an oil. The oil is dissolved in dilute acetic acid and a saturated aqueous solution of ammonium nitrate is added with stirring and cooling. The precipitate which forms is collected and recrystallized twice from water to yield 8.3 g. of product. Recrystallization from ethanol yields pure 10-acetyl-3-epiyohimbine (as the nitrate salt with ½ mol of ethanol), M.P. 209–213° C. (dec.), $[\alpha]_D^{25}$ —44° (pyridine, c.=0.75).

*Analysis.*—Calc.: C, 59.74; H, 6.69; N, 8.71. Found: C, 59.80; H, 6.52; N, 8.98.

*Example 21*

A solution of 100 ml. methylene chloride in 150 ml. acetic anhydride is saturated with boron trifluoride by passing in the latter for about 15 minutes while maintaining the temperature at —15° to —20° C. A suspension of 8 g. 3-epi-β-yohimbine in 50 ml. methylene chloride is added slowly while the mixture is stirred at —30° to —40° C. The stirring is continued for 4.5 hours during which time the temperature is allowed to slowly rise to 0° C. The solution is poured onto a liter of crushed ice, basified by the addition of ammonium hydroxide, and the layers are separated. The aqueous layer is extracted with 250 ml. methylene chloride and the combined methylene chloride solutions are dried over sodium sulfate and evaporated in vacuo to dryness. The resulting oil is redissolved in dilute acetic acid and again made basic with ammonium hydroxide. The precipitate which forms is dried overnight in a vacuum desiccator. Yield: 7.5 g. This material is dissolved in a minimal amount of ethyl acetate and chromatographed over 100 g. acid washed alumina, using ethyl acetate as the eluant. Concentration of the first 220 g. of eluate gives 3.8 g. of crystals which on recrystallization from methanol yield pure 10-acetyl-3-epi-β-yohimbine acetate (as the hydrate), M.P. 210° C. (dec.), $[\alpha]_D^{25}$ —97° (pyridine( c.=0.94).

*Analysis.*—Calc.: C, 65.77; H, 7.07; N, 6.14. Found: C, 65.64; H, 7.04; N, 6.05.

*Example 22*

15 ml. glacial acetic acid and 60 ml. acetic anhydride are saturated with boron trifluoride and reacted with 1.0 g. α-yohimbine (alloyohimbine) for 3 hours at —20° C. by the procedure of Example 1. Crystallization of the chloroform extract from acetonitrile yields 0.61 g. solids in two crops, which on recrystallization from acetonitrile yield pure 10-acetyl-α-yohimbine acetate, M.P. 242–246° C. (dec.), $[\alpha]_D^{25}$+33° C. (pyridine, c.=0.50).

*Analysis.*—Calc.: C, 68.47; H, 6.90; N, 6.39. Found: C, 68.74; H, 7.08; N, 6.55.

It is understood that the foregoing detailed description is given merely by way of illustration and that many variations may be made therein without departing from the spirit of my invention.

Having described my invention, what I desire to secure by Letters Patent is:

1. A member selected from the group consisting of compounds of the formula:

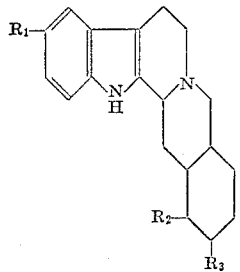

wherein the yohimbane ring system is selected from the group consisting of yohimbane, 3-epiyohimbane, alloyohimbane and 3-epialloyohimbane and wherein $R_1$ is the acyl radical of an unsubstituted saturated aliphatic carboxylic acid of 1 to 6 carbon atoms; $R_2$ is a member selected from the group consisting of hydrogen, lower alkyl, keto, carbo lower alkoxy, and a radical of the formula —$CH_2OR_4$; $R_3$ is a member selected from the group consisting of hydrogen when $R_2$ is a member of the group consisting of hydrogen, lower alkyl, and keto; keto when $R_2$ is lower alkyl; lower alkoxy when $R_2$ is carbo lower alkoxy; and a radical of the formula —$OR_4$ when $R_2$ is a member of the group consisting of hydrogen, lower alkyl, carbo lower alkoxy, and a radical of the formula —$CH_2OR_4$; and $R_4$ is a member selected from the group consisting of hydrogen, the acyl radical of an unsubstituted saturated aliphatic carboxylic acid of 1 to 6 carbon atoms, benzoyl and substituted benzoyl substituted with from one to three lower alkoxy groups; and the pharmaceutically acceptable non-toxic acid addition and quaternary ammonium salts thereof with a compound selected from the group consisting of methyl iodide, ethyl bromide, n-hexyl bromide, methyl sulfate, ethyl sulfate and methyl p-toluene sulfonate.

2. 10-acetylyohimbane.
3. 10-acetyl-16α-methylyohimbane.
4. 10-acetyl-16-ketoyohimbane.
5. 10-acetyl-16α-methylyohimbone.
6. 10-acetylepiyohimbol acetate.
7. 10-acetylepiyohimbol.
8. 10-acetyl-16α-methylyohimbol acetate.
9. 10-acetyl-16α-methylyohimbol.
10. 10-acetylyohimbyl alcohol diacetate.
11. 10-acetylyohimbyl alcohol.
12. 10-propionylyohimbine propionate.
13. 10-acetylyohimbine acetate.
14. 10-acetylyohimbine.
15. 10-acetylyohimbine benzoate.
16. 10-acetylyohimbine 3,4,5-trimethoxybenzoate.
17. 10-acetyl-β-yohimbine acetate.
18. 10-acetyl-β-yohimbine.
19. 10-acetyl-β-yohimbine methyl ether.
20. 10-acetyl-3-epiyohimbine acetate.
21. 10-acetyl-3-epiyohimbine.
22. 10-acetyl-3-epi-β-yohimbine acetate.
23. 10-acetyl-α-yohimbine acetate.
24. A method of preparing compounds of the formula:

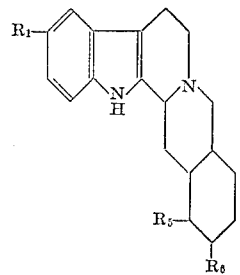

wherein the yohimbane ring system is selected from the group consisting of yohimbane, 3-epiyohimbane, alloyohimbane and 3-epialloyohimbane and wherein $R_1$ is the acyl radical of an unsubstituted saturated aliphatic carboxylic acid of 1 to 6 carbon atoms; $R_5$ is a member selected from the group consisting of hydrogen, lower alkyl, keto, carbo lower alkoxy, and a radical of the formula —$CH_2OR_1$; and $R_6$ is a member selected from the group consisting of hydrogen when $R_5$ is a member of the group consisting of hydrogen, lower alkyl and keto; keto when $R_5$ is lower alkyl; lower alkoxy when $R_5$ is carbo lower alkoxy; and a radical of the formula —$OR_1$ when $R_5$ is a member of the group consisting of hydrogen, lower alkyl, carbo lower alkoxy and a radical of the formula —$CH_2OR_1$ which comprises treating a member selected from the group consisting of a carboxylic acid anhydride $(R_1)_2O$ and a carboxylic acid halide R, X wherein X is halogen in an anhydrous medium comprising a Friedel-Crafts catalyst at a temperature between about +25° C. and —40° C. with a compound of the formula:

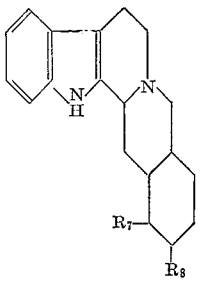

wherein $R_7$ is a member selected from the group consisting of hydrogen, lower alkyl, keto, carbo lower alkoxy and hydroxymethyl and $R_8$ is a member selected from the group consisting of hydrogen, when $R_7$ is a member of the group consisting of hydrogen, lower alkyl and keto; keto when $R_7$ is lower alkyl; lower alkoxy when $R_7$ is carbo lower alkoxy; and hydroxyl when $R_8$ is a member of the group consisting of hydrogen, lower alkyl, carbo lower alkoxy and hydroxymethyl.

25. A method according to claim 24 wherein the reaction mixture includes a member selected from the group consisting of a carboxylic acid of the formula $R_1$—OH and a carboxylic acid ester of the formula $R_1$—$OR_6$ wherein $R_6$ is a lower alkyl group.

26. A method according to claim 24 wherein said Friedel-Crafts catalyst is boron trifluoride.

27. A method of preparing compounds of the formula:

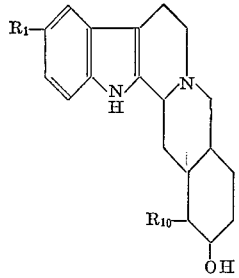

wherein the yohimbane ring system is selected from the group consisting of yohimbane, 3-epiyohimbane, alloyohimbane and 3-epialloyohimbane and wherein $R_1$ is the acyl radical of an unsubstituted saturated aliphatic carboxylic acid of 1 to 6 carbon atoms and $R_{10}$ is a member selected from the group consisting of hydrogen, lower alkyl, carbo lower alkoxy and hydroxymethyl, which comprises refluxing a solution in an inert solvent of a compound of the formula:

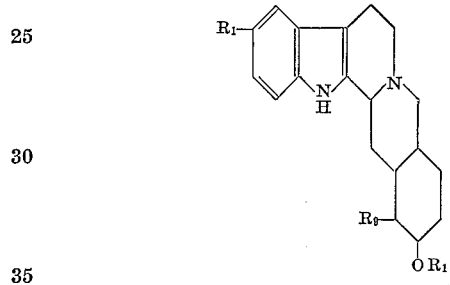

wherein $R_9$ is a member selected from the group consisting of hydrogen, lower alkyl, carbo lower alkoxy, and a radical of the formula —$CH_2OR_1$ in the presence of an alkali metal alkoxide.

28. A method according to claim 27 wherein said inert solvent is methanol and said alkali metal alkoxide is sodium methoxide.

References Cited in the file of this patent

Chatterjee et al.: Chemical Abstracts, vol. 54 (1960), pages 13161 and 13162.